(12) United States Patent
Silcock et al.

(10) Patent No.: US 12,534,438 B2
(45) Date of Patent: Jan. 27, 2026

(54) CANNABINOID DERIVATIVE AS A PHARMACEUTICALLY ACTIVE COMPOUND AND METHOD OF PREPARATION THEREOF

(71) Applicant: Jazz Pharmaceuticals Research UK Limited, Sittingbourne (GB)

(72) Inventors: Alan James Silcock, Cambridgeshire (GB); Antoine Millet, Cambridgeshire (GB); Karen Ka-Yen Tse, Cambridgeshire (GB); Paul Stuart Hinchliffe, Cambridgeshire (GB); Andrew Sharpe, Cambridgeshire (GB)

(73) Assignee: JAZZ PHARMACEUTICALS RESEARCH UK LIMITED, Sittingbourne (GB)

( * ) Notice: Subject to any disclaimer, the term of this patent is extended or adjusted under 35 U.S.C. 154(b) by 332 days.

(21) Appl. No.: 18/257,537

(22) PCT Filed: Dec. 15, 2021

(86) PCT No.: PCT/GB2021/053313
§ 371 (c)(1),
(2) Date: Jun. 14, 2023

(87) PCT Pub. No.: WO2022/129908
PCT Pub. Date: Jun. 23, 2022

(65) Prior Publication Data
US 2024/0043388 A1 Feb. 8, 2024

(30) Foreign Application Priority Data
Dec. 15, 2020 (GB) .................................. 2019784

(51) Int. Cl.
C07D 231/12 (2006.01)
A61P 25/08 (2006.01)

(52) U.S. Cl.
CPC ............ *C07D 231/12* (2013.01); *A61P 25/08* (2018.01)

(58) Field of Classification Search
CPC ............................... C07D 231/12; A61P 25/08
See application file for complete search history.

(56) References Cited

U.S. PATENT DOCUMENTS

| | | |
|---|---|---|
| 8,632,825 B2 | 1/2014 | Velasco Diez et al. |
| 8,790,719 B2 | 7/2014 | Parolaro et al. |
| 9,017,737 B2 | 4/2015 | Kikuchi et al. |
| 9,125,859 B2 | 9/2015 | Whalley et al. |
| 9,474,726 B2 | 10/2016 | Guy et al. |
| 9,675,654 B2 | 6/2017 | Parolaro et al. |
| 9,949,936 B2 | 4/2018 | Guy et al. |
| 9,949,937 B2 | 4/2018 | Guy et al. |
| 9,956,183 B2 | 5/2018 | Guy et al. |
| 9,956,184 B2 | 5/2018 | Guy et al. |
| 9,956,185 B2 | 5/2018 | Guy et al. |
| 9,956,186 B2 | 5/2018 | Guy et al. |
| 9,962,341 B2 | 5/2018 | Stott et al. |
| 10,039,724 B2 | 8/2018 | Stott et al. |
| 10,092,525 B2 | 10/2018 | Guy et al. |
| 10,098,867 B2 | 10/2018 | Javid et al. |
| 10,111,840 B2 | 10/2018 | Guy et al. |
| 10,137,095 B2 | 11/2018 | Guy et al. |
| 10,220,005 B2 | 3/2019 | Martinez-Orgado et al. |
| 10,226,433 B2 | 3/2019 | Di Marzo et al. |
| 10,583,096 B2 | 3/2020 | Guy et al. |
| 10,603,288 B2 | 3/2020 | Guy et al. |
| 10,653,641 B2 | 5/2020 | Robson et al. |
| 10,709,671 B2 | 7/2020 | Guy et al. |
| 10,709,673 B2 | 7/2020 | Guy |
| 10,709,674 B2 | 7/2020 | Guy et al. |
| 10,729,665 B2 | 8/2020 | Whalley et al. |
| 10,758,514 B2 | 9/2020 | Liu et al. |
| 10,765,643 B2 | 9/2020 | Guy et al. |
| 10,799,467 B2 | 10/2020 | Whalley et al. |
| 10,807,777 B2 | 10/2020 | Whittle |
| 10,849,860 B2 | 12/2020 | Guy et al. |
| 10,918,608 B2 | 2/2021 | Guy et al. |
| 10,966,939 B2 | 4/2021 | Guy et al. |
| 11,000,486 B2 | 5/2021 | Wright et al. |
| 11,065,209 B2 | 7/2021 | Guy et al. |

(Continued)

FOREIGN PATENT DOCUMENTS

| | | |
|---|---|---|
| CN | 112592260 A | 4/2021 |
| WO | WO-9953917 A1 | 10/1999 |
| WO | WO-0129007 A1 | 4/2001 |
| WO | WO-2011006099 A1 | 1/2011 |
| WO | WO-2014062965 A1 | 4/2014 |

(Continued)

OTHER PUBLICATIONS

Anagnostaki, E. E. & Zografo, A. L., "Non-natural elemane as the "stepping stone" for the synthesis of germacrane and guaiane sesquiterpenes," Org Lett, 15(1):152-155 (2013); doi: 10.1021/013031999. Epub Dec. 20, 2012.

Bailey, S. et al., "Lewis-Acid-Mediated Union of Epoxy-Carvone Diastereomers with Anisole Derivatives: Mechanistic Insight and Application to the Synthesis of Non-natural CBD Analogues," Org. Lett., 20:4618-4621 (2018).

Brown, W. C. et al., "Comparative Assay of Antiepileptic Drugs by "Psychomotor" Seizure Test and Minimal Electroshock Threshold Test," J. Pharmacol. Exp. Ter., 107: 273-283 (1953).

Durmuller, N. et al., "Proconvulsant and anticonvulsant effects of Evans blue dye in rodents," NeuroReport, 4(6):683-686 (1993).

(Continued)

*Primary Examiner* — Timothy R Rozof
(74) *Attorney, Agent, or Firm* — COOLEY LLP (57) ABSTRACT

The present invention relates to a cannabinoid derivative as a pharmaceutically active compound and method of preparation thereof. The cannabinoid derivative of the invention is an analogue of cannabidiol (CBD). CBD is a non-psychoactive cannabinoid which has been used to treat various diseases and disorders. While such treatments hold promise, there remains a need in the art for more effective treatments and this has been brought about by way of the cannabinoid derivative of the invention.

9 Claims, 3 Drawing Sheets

(56) References Cited

U.S. PATENT DOCUMENTS

| | | |
|---|---|---|
| 11,065,227 B2 | 7/2021 | Stott et al. |
| 11,096,905 B2 | 8/2021 | Guy et al. |
| 11,147,776 B2 | 10/2021 | Stott et al. |
| 11,147,783 B2 | 10/2021 | Stott et al. |
| 11,154,516 B2 | 10/2021 | Guy et al. |
| 11,154,517 B2 | 10/2021 | Guy et al. |
| 11,160,757 B1 | 11/2021 | Wilkhu et al. |
| 11,160,795 B2 | 11/2021 | Guy et al. |
| 11,207,292 B2 | 12/2021 | Guy et al. |
| 11,229,612 B2 | 1/2022 | Wright et al. |
| 11,291,631 B2 | 4/2022 | Shah |
| 11,311,498 B2 | 4/2022 | Guy et al. |
| 11,318,109 B2 | 5/2022 | Whalley et al. |
| 11,357,741 B2 | 6/2022 | Guy et al. |
| 11,400,055 B2 | 8/2022 | Guy et al. |
| 11,406,623 B2 | 8/2022 | Guy et al. |
| 11,413,266 B2 | 8/2022 | Biró et al. |
| 11,419,829 B2 | 8/2022 | Whalley et al. |
| 11,426,362 B2 | 8/2022 | Wright et al. |
| 11,446,258 B2 | 9/2022 | Guy et al. |
| 11,590,087 B2 | 2/2023 | Guy et al. |
| 11,633,369 B2 | 4/2023 | Guy et al. |
| 11,679,087 B2 | 6/2023 | Guy et al. |
| 11,684,598 B2 | 6/2023 | Stott et al. |
| 11,701,330 B2 | 7/2023 | Guy et al. |
| 11,766,411 B2 | 9/2023 | Guy et al. |
| 11,793,770 B2 | 10/2023 | Stott et al. |
| 11,806,319 B2 | 11/2023 | Wilkhu et al. |
| 11,865,102 B2 | 1/2024 | Guy et al. |
| 11,963,937 B2 | 4/2024 | Guy |
| 12,023,305 B2 | 7/2024 | Whalley et al. |
| 12,064,398 B2 | 8/2024 | Wright et al. |
| 12,064,399 B2 | 8/2024 | Guy et al. |
| 12,102,619 B2 | 10/2024 | Guy et al. |
| 2007/0072939 A1 | 3/2007 | Kupper |
| 2015/0359756 A1 | 12/2015 | Guy et al. |
| 2017/0209390 A1 | 7/2017 | Stott et al. |
| 2017/0239193 A1 | 8/2017 | Guy et al. |
| 2018/0071210 A1 | 3/2018 | Wilkhu et al. |
| 2018/0228751 A1 | 8/2018 | Stott et al. |
| 2019/0167583 A1 | 6/2019 | Shah |
| 2019/0314296 A1 | 10/2019 | Wright et al. |
| 2019/0321307 A1 | 10/2019 | Guy et al. |
| 2019/0365667 A1 | 12/2019 | Wright et al. |
| 2020/0138738 A1 | 5/2020 | Guy et al. |
| 2020/0179303 A1 | 6/2020 | Guy et al. |
| 2020/0206153 A1 | 7/2020 | Whalley et al. |
| 2020/0237683 A1 | 7/2020 | Whalley et al. |
| 2020/0297656 A1 | 9/2020 | Guy et al. |
| 2020/0352878 A1 | 11/2020 | Guy et al. |
| 2021/0015789 A1 | 1/2021 | Guy et al. |
| 2021/0052512 A1 | 2/2021 | Guy et al. |
| 2021/0059949 A1 | 3/2021 | Wilkhu et al. |
| 2021/0059960 A1 | 3/2021 | Wilkhu et al. |
| 2021/0059976 A1 | 3/2021 | Wilkhu et al. |
| 2021/0069333 A1 | 3/2021 | Velasco Diez et al. |
| 2021/0100755 A1 | 4/2021 | Whalley et al. |
| 2021/0169824 A1 | 6/2021 | Guy et al. |
| 2021/0177773 A1 | 6/2021 | Guy et al. |
| 2021/0290565 A1 | 9/2021 | Guy et al. |
| 2021/0308072 A1 | 10/2021 | Wright et al. |
| 2021/0330636 A1 | 10/2021 | Guy et al. |
| 2021/0401771 A1 | 12/2021 | Guy et al. |
| 2022/0000800 A1 | 1/2022 | Guy et al. |
| 2022/0008355 A1 | 1/2022 | Guy et al. |
| 2022/0016048 A1 | 1/2022 | Guy et al. |
| 2022/0023232 A1 | 1/2022 | Guy et al. |
| 2022/0040155 A1 | 2/2022 | Guy et al. |
| 2022/0062197 A1 | 3/2022 | Stott et al. |
| 2022/0062211 A1 | 3/2022 | Stott et al. |
| 2022/0087951 A1 | 3/2022 | Knappertz |
| 2022/0096397 A1 | 3/2022 | Wright et al. |
| 2022/0168266 A1 | 6/2022 | Guy et al. |
| 2022/0183997 A1 | 6/2022 | Guy et al. |
| 2022/0184000 A1 | 6/2022 | Guy et al. |
| 2022/0202738 A1 | 6/2022 | Guy et al. |
| 2022/0211629 A1 | 7/2022 | Wilkhu et al. |
| 2022/0226257 A1 | 7/2022 | Guy et al. |
| 2022/0233495 A1 | 7/2022 | Silcock et al. |
| 2022/0249396 A1 | 8/2022 | Guy et al. |
| 2022/0257529 A1 | 8/2022 | Guy et al. |
| 2022/0265573 A1 | 8/2022 | Guy et al. |
| 2022/0288055 A1 | 9/2022 | Silcock et al. |
| 2022/0378714 A1 | 12/2022 | Guy et al. |
| 2022/0378715 A1 | 12/2022 | Guy et al. |
| 2022/0378738 A1 | 12/2022 | Guy et al. |
| 2022/0387347 A1 | 12/2022 | Whalley et al. |
| 2022/0395470 A1 | 12/2022 | Whalley et al. |
| 2022/0395471 A1 | 12/2022 | Guy et al. |
| 2023/0000789 A1 | 1/2023 | Guy et al. |
| 2023/0022487 A1 | 1/2023 | Guy et al. |
| 2023/0024312 A1 | 1/2023 | Whalley et al. |
| 2023/0026079 A1 | 1/2023 | Guy et al. |
| 2023/0032502 A1 | 2/2023 | Guy et al. |
| 2023/0038423 A1 | 2/2023 | Silcock et al. |
| 2023/0068885 A1 | 3/2023 | Guy et al. |
| 2023/0143812 A1 | 5/2023 | Knappertz et al. |
| 2023/0235825 A1 | 7/2023 | Thompson et al. |
| 2023/0248664 A1 | 8/2023 | Guy |
| 2023/0263744 A1 | 8/2023 | Guy |
| 2023/0277560 A1 | 9/2023 | Checketts et al. |
| 2023/0277561 A1 | 9/2023 | Checketts et al. |
| 2023/0277562 A1 | 9/2023 | Checketts et al. |
| 2023/0277563 A1 | 9/2023 | Checketts et al. |
| 2023/0285419 A1 | 9/2023 | Checketts et al. |
| 2023/0285420 A1 | 9/2023 | Checketts et al. |
| 2023/0285421 A1 | 9/2023 | Checketts et al. |
| 2023/0285422 A1 | 9/2023 | Checketts et al. |
| 2023/0285423 A1 | 9/2023 | Checketts et al. |
| 2023/0285424 A1 | 9/2023 | Checketts et al. |
| 2023/0285425 A1 | 9/2023 | Checketts et al. |
| 2023/0285426 A1 | 9/2023 | Checketts et al. |
| 2023/0285427 A1 | 9/2023 | Checketts et al. |
| 2023/0285428 A1 | 9/2023 | Checketts et al. |
| 2023/0301934 A1 | 9/2023 | Whalley et al. |
| 2023/0301936 A1 | 9/2023 | Guy |
| 2023/0310464 A1 | 10/2023 | Checketts et al. |
| 2023/0346809 A1 | 11/2023 | Craig |
| 2023/0372367 A1 | 11/2023 | Checketts et al. |
| 2023/0372368 A1 | 11/2023 | Checketts et al. |
| 2024/0016819 A1 | 1/2024 | Craig |
| 2024/0025858 A1* | 1/2024 | Silcock ............... C07D 233/64 |
| 2024/0033229 A1 | 2/2024 | Guy et al. |
| 2024/0050452 A1 | 2/2024 | Craig et al. |
| 2024/0091241 A1 | 3/2024 | Guy et al. |
| 2024/0215910 A1* | 7/2024 | Tse ............... G01N 33/9473 |
| 2024/0238218 A1 | 7/2024 | Silcock et al. |
| 2024/0254066 A1* | 8/2024 | Silcock ............... C07C 29/143 |
| 2024/0254072 A1 | 8/2024 | Silcock et al. |
| 2024/0261234 A1 | 8/2024 | Guy |
| 2024/0293762 A1 | 9/2024 | Loft et al. |

FOREIGN PATENT DOCUMENTS

| | | |
|---|---|---|
| WO | WO-2014159688 A1 | 10/2014 |
| WO | WO-2015193667 A1 | 12/2015 |
| WO | WO-2015193668 A1 | 12/2015 |
| WO | WO-2016094810 A2 | 6/2016 |
| WO | WO-2016203239 A1 | 12/2016 |
| WO | WO-2018061007 A1 | 4/2018 |
| WO | WO-2018205022 A1 | 11/2018 |
| WO | WO-2020104796 A1 | 5/2020 |
| WO | WO-2020232545 A1 | 11/2020 |
| WO | WO-2021099781 A1 | 5/2021 |
| WO | WO-2021099783 A1 | 5/2021 |

OTHER PUBLICATIONS

Eadie, M. J., "Shortcomings in the current treatment of epilepsy," Expert Rev Neurother., 12(12):1419-1427 (2012).

Fisher, R. S. et al., "A practical definition of epilepsy," Epilepsia, 55(4):475-482 (2014).

(56) References Cited

OTHER PUBLICATIONS

Fisher, R. S. et al., "Operational classification of seizure types by the International League Against Epilepsy: Position Paper of the ILAE Commission for Classification and Terminology," Epilepsia, 58(4):522-530 (2017); doi: 10.1111/epi.13670. Epub Mar. 8, 2017.
Harvey, D. J., "Characterization of the Butyl Homologues of Delta1-tetrahydrocannabinol, Cannabinol and Cannabidiol in Samples of Cannabis by Combined Gas Chromatography and Mass Spectrometry," J. Pharm. Pharmac., 28:280-285 (1976).
Hill, T. D. M. et al., "Cannabidivarin-rich cannabis extracts are anticonvulsant in mouse and rat via a CB 1 receptor- independent mechanism," British Journal of Pharmacology, 170(3):679-692 (2013).
Jiang, R. et al., "Identification of cytochrome P450 enzymes responsible for metabolism of cannabidiol by human liver microsomes," Life Sciences, 89(5):165-170 (2011).
Kwan, P. et al., "Definition of drug resistant epilepsy: consensus proposal by the ad hoc Task Force of the ILAE Commission on Therapeutic Strategies," Epilepsia, 51(6):1069-1077; doi:10.1111/j.1528-1167.2009.02397.x. Epub Nov. 3, 2009. Erratum in: Epilepsia. Sep. 2010; 51(9):1922.
Lander, N. et al., "Total Syntheses of Cannabidiol and Δ1-Tetrahydrocannabiinol Metabolites," J Chem Soc Perkin 1, (1):8-16 (1976).
Morales, P. et al., "An Overview on Medicinal Chemistry of Synthetic and Natural Derivatives of Cannabidiol," Frontiers in Pharmacology, 8:422 (2017); doi:10.3389/fphar.2017.00422, 18 pages.
Naik, R. H. et al., "Cannabinoid Derivative," Indian Journal of Chemistry, pp. 306-307, Apr. 4, 1987, XP055942064, 1 page.
Shing, T. K. M. et al., "Mild Manganese (III) Acetate Catalyzed Allylic Oxidation: Application to Simple and Complex Alkalenes," Organic Letters, 8(14):3149-3151 (2006).
Thurman, D. J. et al., "Standards for epidemiologic studies and surveillance of epilepsy," Epilepsia, 52 (Suppl 7):2-26 (2011).
Elsohly, M. & Gul, W., Handbook of Cannabis, Chapter 1, Constituents of Cannabis Sativa, Roger Pertwee, Ed., 2012, 21 pages.
EPIDIOLEX® (cannabidiol) oral solution, CV, Prescribing Information, 2018, 30 pages; https://www.accessdata.fda.gov/drugsatfda_docs/label/2018/210365lbl.pdf.
Gong, X. et al., "Synthesis of CBD and Its Derivatives Bearing Various C4'-Side Chains with a Late-Stage Diversification Method," J. Org. Chem., 85:2704-2715 (2020).
Kimball, A. W. et al., "Chemical Protection against Ionizing Radiation," Radiation Research, 7:1-12 (1957).
Lago-Fernandez, A. et al., "New Methods for the Synthesis of Cannabidiol Derivatives," Methods in Enzymology, 593:237-257 (2017).
Lazarini-Lopes, W. et al., "The anticonvulsant effects of cannabidiol in experimental models of epileptic seizures: From behavior and mechanisms to clinical insights," Neuroscience and Biobehavioral Reviews, 111:166-182 (2020).
Litchfield, J. T. & Wilcoxon, F., "A simplified method of evaluating dose-effect experiments," J Pharmacol Exp Ther, 96(2):99-113 (1949).
Pertwee, R. G., "The Pharmacology and Therapeutic Potential of Cannabidiol," Cannabinoids, Chapter 3, DiMarzo, V. (Ed.), pp. 32-83 (2004).
U.S. Appl. No. 15/640,033, filed Jun. 30, 2017.
U.S. Appl. No. 16/768,241, filed May 29, 2020.
U.S. Appl. No. 16/959,350, filed Jun. 30, 2020.
U.S. Appl. No. 16/959,354, filed Jun. 30, 2020.
U.S. Appl. No. 16/959,357, filed Jun. 30, 2020.
U.S. Appl. No. 16/935,005, filed Jul. 21, 2020.
U.S. Appl. No. 17/012,448, filed Sep. 4, 2020.
U.S. Appl. No. 17/050,956, filed Oct. 27, 2020.
U.S. Appl. No. 17/102,109, filed Nov. 23, 2020.
U.S. Appl. No. 17/231,625, filed Apr. 15, 2021.
U.S. Appl. No. 17/296,066, filed May 21, 2021.
U.S. Appl. No. 17/296,076, filed May 21, 2021.
U.S. Appl. No. 17/424,682, filed Jul. 21, 2021.
U.S. Appl. No. 17/426,442, filed Jul. 28, 2021.
U.S. Appl. No. 17/406,401, filed Aug. 19, 2021.
U.S. Appl. No. 17/435,892, filed Sep. 2, 2021.
U.S. Appl. No. 17/472,000, filed Sep. 10, 2021.
U.S. Appl. No. 17/548,232, filed Dec. 10, 2021.
U.S. Appl. No. 17/606,370, filed Oct. 25, 2021.
U.S. Appl. No. 17/611,824, filed Nov. 16, 2021.
U.S. Appl. No. 17/529,005, filed Nov. 17, 2021.
U.S. Appl. No. 17/576,868, filed Jan. 14, 2022.
U.S. Appl. No. 17/585,485, filed Jan. 26, 2022.
U.S. Appl. No. 17/627,946, filed Jan. 18, 2022.
U.S. Appl. No. 17/631,069, filed Jan. 28, 2022.
U.S. Appl. No. 17/638,629, filed Feb. 25, 2022.
U.S. Appl. No. 17/689,607, filed Mar. 8, 2022.
U.S. Appl. No. 17/689,245, filed Mar. 8, 2022.
U.S. Appl. No. 17/744,224, filed May 13, 2022.
U.S. Appl. No. 17/768,048, filed Apr. 11, 2022.
U.S. Appl. No. 17/770,435, filed Apr. 20, 2022.
U.S. Appl. No. 17/770,436, filed Apr. 20, 2022.
U.S. Appl. No. 17/771,184, filed Apr. 22, 2022.
U.S. Appl. No. 17/771,190, filed Apr. 22, 2022.
U.S. Appl. No. 17/771,195, filed Apr. 22, 2022.
U.S. Appl. No. 17/771,183, filed Apr. 22, 2022.
U.S. Appl. No. 17/777,734, filed May 18, 2022.
U.S. Appl. No. 17/777,677, filed May 18, 2022.
U.S. Appl. No. 17/777,681, filed May 18, 2022.
U.S. Appl. No. 17/841,167, filed Jun. 15, 2022.
U.S. Appl. No. 17/786,949, filed Jun. 17, 2022.
U.S. Appl. No. 17/817,753, filed Aug. 5, 2022.
U.S. Appl. No. 17/853,367, filed Jun. 29, 2022.
U.S. Appl. No. 18/002,437, filed Dec. 19, 2022.
U.S. Appl. No. 18/005,838, filed Jan. 17, 2023.
U.S. Appl. No. 18/005,841, filed Jan. 17, 2023.
U.S. Appl. No. 18/005,845, filed Jan. 17, 2023.
U.S. Appl. No. 18/005,843, filed Jan. 17, 2023.
U.S. Appl. No. 18/005,847, filed Jan. 17, 2023.
U.S. Appl. No. 18/005,848, filed Jan. 17, 2023.
U.S. Appl. No. 18/005,851, filed Jan. 18, 2023.
U.S. Appl. No. 18/005,852, filed Jan. 18, 2023.
U.S. Appl. No. 18/005,853, filed Jan. 18, 2023.
U.S. Appl. No. 18/005,959, filed Jan. 18, 2023.
U.S. Appl. No. 18/005,960, filed Jan. 18, 2023.
U.S. Appl. No. 18/005,961, filed Jan. 18, 2023.
U.S. Appl. No. 18/006,125, filed Jan. 19, 2023.
U.S. Appl. No. 18/006,127, filed Jan. 19, 2023.
U.S. Appl. No. 18/006,129, filed Jan. 19, 2023.
U.S. Appl. No. 18/006,131, filed Jan. 19, 2023.
U.S. Appl. No. 18/006,133, filed Jan. 19, 2023.
U.S. Appl. No. 18/006,121, filed Jan. 19, 2023.
U.S. Appl. No. 18/161,603, filed Jan. 30, 2023.
U.S. Appl. No. 18/170,235, filed Feb. 16, 2023.
U.S. Appl. No. 18/043,810, filed Mar. 2, 2023.
U.S. Appl. No. 18/044,941, filed Mar. 10, 2023.
U.S. Appl. No. 18/245,856, filed Mar. 17, 2023.
U.S. Appl. No. 18/186,792, filed Mar. 20, 2023.
U.S. Appl. No. 18/311,221, filed May 2, 2023.
U.S. Appl. No. 18/320,906, filed May 19, 2023.
U.S. Appl. No. 18/256,307, filed Jun. 7, 2023.
U.S. Appl. No. 18/257,373, filed Jun. 14, 2023.
U.S. Appl. No. 18/257,479, filed Jun. 14, 2023.
U.S. Appl. No. 18/258,485, filed Jun. 20, 2023.
U.S. Appl. No. 18/446,405, filed Aug. 8, 2023.
U.S. Appl. No. 18/546,254, filed Aug. 11, 2023.
U.S. Appl. No. 18/548,003, filed Aug. 25, 2023.
U.S. Appl. No. 18/477,467, filed Sep. 28, 2023.
U.S. Appl. No. 18/479,671, filed Oct. 2, 2023.
U.S. Appl. No. 18/560,316, filed Nov. 10, 2023.
U.S. Appl. No. 18/560,337, filed Nov. 10, 2023.
U.S. Appl. No. 18/560,341, filed Nov. 10, 2023.
U.S. Appl. No. 18/560,346, filed Nov. 10, 2023.
U.S. Appl. No. 18/526,795, filed Dec. 1, 2023.
U.S. Appl. No. 18/545,754, filed Dec. 19, 2023.
U.S. Appl. No. 18/292,844, filed Jan. 26, 2024.

* cited by examiner

Figure 1. Effect of Compound of Formula I on the electroshock-induced generalised seizure threshold (MEST) in the mouse

*** $P<0.001$ Significant change in threshold when compared to own vehicle

Figure 2. Pharmacokinetics of compound 1 in rat

Figure 3. PK parameters against measured dose in rat showing A) $AUC_{last}$; and B) $C_{max}$

A)

B)

CANNABINOID DERIVATIVE AS A PHARMACEUTICALLY ACTIVE COMPOUND AND METHOD OF PREPARATION THEREOF

CROSS-REFERENCE TO RELATED APPLICATIONS

This application is a U.S. National Phase application, filed under 35 U.S.C. § 371(c), of International Application No. PCT/GB2021/053313, filed Dec. 15, 2021, which claims priority to, and the benefit of, GB 2019784.4, filed Dec. 15, 2020. Each of these documents is incorporated by reference herein in its entirety for all purposes.

FIELD OF THE INVENTION

The present invention relates to a cannabinoid derivative as a pharmaceutically active compound and method of preparation thereof.

The cannabinoid derivative of the invention is an analogue of cannabidiol (CBD). CBD is a non-psychoactive cannabinoid which has been used to treat various diseases and disorders. While such treatments hold promise, there remains a need in the art for more effective treatments and this has been brought about by way of the cannabinoid derivative of the invention.

BACKGROUND TO THE INVENTION

Cannabinoids are natural and synthetic compounds structurally or pharmacologically related to the constituents of the *cannabis* plant or to the endogenous agonists (endocannabinoids) of the cannabinoid receptors CB1 or CB2. The only way in nature in which these compounds are produced is by the *cannabis* plant. *Cannabis* is a genus of flowering plants in the family Cannabaceae, comprising the species *Cannabis sativa*, *Cannabis indica*, and *Cannabis ruderalis* (sometimes considered as part of *Cannabis sativa*).

*Cannabis* plants comprise a highly complex mixture of compounds. At least 568 unique molecules have been identified. Among these compounds are cannabinoids, terpenoids, sugars, fatty acids, flavonoids, other hydrocarbons, nitrogenous compounds, and amino acids.

Cannabinoids exert their physiological effects through a variety of receptors including, but not limited to, adrenergic receptors, cannabinoid receptors (CB1 and CB2), GPR55, GPR3, or GPR5. The principle cannabinoids present in *cannabis* plants are cannabinoid acids Δ9-tetrahydrocannabinolic acid (Δ9-THCA) and cannabidiolic acid (CBDA) with small amounts of their respective neutral (decarboxylated) cannabinoids. In addition, *cannabis* may contain lower levels of other minor cannabinoids.

There are currently four cannabinoid-based pharmaceutical approved products on the market. These are: dronabinol (Marinol®) which is a synthetic tetrahydrocannabinol (THC) approved for the treatment of loss of appetite in AIDS and the treatment of severe nausea and vomiting caused by cancer chemotherapy; nabilone (Cesamet®) which is a synthetic cannabinoid and an analog of THC which is approved for the treatment of nausea and vomiting caused by cytotoxic chemotherapy unresponsive to conventional antiemetics; nabiximols (Sativex®) a mixture of two *cannabis* plant extracts approved for the treatment of neuropathic pain, spasticity, overactive bladder, and other symptoms of multiple sclerosis; and highly purified botanical CBD (Epidiolex®) approved in the United States for the treatment of Dravet syndrome and Lennox-Gastaut syndrome in children and adults over the age of 2 years.

As can be seen above cannabinoids are a class of compounds which may be derived naturally from the *cannabis* plant or produced semi-synthetically or synthetically via chemical synthesis.

More than 100 different cannabinoids have been identified. These cannabinoids can be split into different groups as follows: phytocannabinoids; endocannabinoids and synthetic cannabinoids (which may be novel cannabinoids or synthetically produced versions of phytocannabinoids or endocannabinoids). The Handbook of *Cannabis*, Roger Pertwee, Chapter 1, pages 3 to 15 details the cannabinoids known to date.

Cannabidiol (CBD) is a major cannabinoid constituent of *Cannabis* species, such as the hemp plant (*Cannabis sativa*). Unlike other cannabinoids, such as THC, cannabidiol does not bind to CB1 or CB2 receptors, or its binding to the receptors is negligible in terms of inducing a pharmacological effect. Thus, cannabidiol does not cause the central or peripheral nervous system effects mediated by the CB1 or CB2 receptors. CBD has little or no psychotropic (cannabimimetic) activity and its molecular structure and properties are substantially different from those of other cannabinoids.

Cannabidiol administration has been the subject of research in an attempt to provide an alternative treatment for various diseases and disorders which may respond to such treatment.

Whilst literature such as Gong et al. (2019) have described possible synthetic routes to generate C4'-substituted derivatives of CBD, giving a broad range of compounds that could be potentially generated and potentially be tested, there is no provision of any data to suggest the efficacy of such compounds, let alone that any specific compounds would be of particular benefit compared to others in the treatment of a disease.

The present invention has been devised in light of these considerations.

BRIEF SUMMARY OF THE INVENTION

At its most general, the present invention relates to a synthetic cannabinoid compound which is biologically active and hence useful in the treatment of diseases. Such a novel compound may be administered by a wide variety of routes including but not limited to oral, transdermal, buccal, nasal, pulmonary, rectal or ocular. Such compound may be used for the treatment or prevention of a medical condition such as epilepsy.

The cannabidiol derivative of the invention is (1'R,2'R)-5'-methyl-4-(1-methyl-1H-pyrazol-4-yl)-2'-(prop-1-en-2-yl)-1',2',3',4'-tetrahydro-[1,1'-biphenyl]-2,6-diol, and will be referred to as the compound of formula (I) or compound 1 throughout.

In a first aspect of the invention there is provided a compound of formula (I), or a salt thereof:

formula (I)

In a second aspect of the invention there is a pharmaceutical composition comprising the compound of the first aspect and one or more additional ingredients selected from carriers, diluents (e.g. oils), excipients, adjuvants, fillers, buffers, binders, disintegrants, preservatives, antioxidants, lubricants, stabilisers, solubilisers, surfactants, masking agents, colouring agents, flavouring agents, and sweetening agents.

Preferably the pharmaceutical composition of the second aspect is in a form selected from a liquid, a solution, a suspension, an emulsion, a syrup, an electuary, a mouthwash, a drop, a tablet, a granule, a powder, a lozenge, a pastille, a capsule, a cachet, a pill, an ampoule, a bolus, a suppository, a pessary, a tincture, a gel, a paste, an ointment, a cream, a lotion, an oil, a foam, a spray, and an aerosol.

In a third aspect of the invention there is provided a compound of the first aspect, or the pharmaceutical composition of the second aspect, for use in a method of treatment.

Preferably, the method of treatment in the third aspect is a method of treatment of epilepsy, generalised seizure or tonic-clonic seizure.

In a fourth aspect of the invention there is provided a compound of the first aspect, or the pharmaceutical composition of the second aspect, for use as a medicament.

Preferably, the medicament of the fourth aspect is a medicament for treating epilepsy, generalised seizure or tonic-clonic seizure.

In a fifth aspect of the invention there is provided a method of treatment comprising administering to a subject in need of treatment a therapeutically effective amount of the compound of the compound of the first aspect or the pharmaceutical composition of the second aspect.

These and other aspects and embodiments of the invention are described in further detail below.

BRIEF SUMMARY OF THE DRAWINGS

Embodiments of the invention are further described hereinafter with reference to the accompanying drawings, in which.

DETAILED DESCRIPTION OF THE INVENTION

The present invention provides a synthetic cannabinoid compound which is biologically active and hence useful in the treatment of diseases.

Synthetic Cannabinoid

The invention provides a compound of formula (I):

formula (I)

The compound of the invention is (1'R,2'R)-5'-methyl-4-(1-methyl-1H-pyrazol-4-yl)-2'-(prop-1-en-2-yl)-1',2',3',4'-tetrahydro-[1,1'-biphenyl]-2,6-diol.

Salts

In some embodiments, the compound of formula (I) is provided in free base form.

Alternatively, it may be convenient or desirable to prepare, purify, and/or handle a corresponding salt of the compound, for example, a pharmaceutically-acceptable salt. Examples of pharmaceutically acceptable salts are discussed in "Pharmaceutical Salts: Properties, Selection, and Use", 2$^{nd}$ Edition, 2002, Stahl and Wermuth (Eds), Wiley-VCH, Weinheim, Germany.

Accordingly, in some embodiments the compound of formula (I) is provided as a salt, for example in a protonated form together with a suitable counter anion.

Suitable counter anions include both organic and inorganic anions. Example of suitable inorganic anions include those derived from inorganic acids, including chloride (Cl$^-$), bromide (Br$^-$), iodide (I$^-$), sulfate (SO$_4^{2-}$), sulfite (SO$_3^{2-}$), nitrate (NO$_3^-$), nitrite (NO$_2^-$), phosphate (PO$_4^{3-}$), and phosphite (PO$_3^{3-}$). Examples of suitable organic anions include 2-acetoxybenzoate, acetate, ascorbate, aspartate, benzoate, camphorsulfonate, cinnamate, citrate, edetate, ethanedisulfonate, ethanesulfonate, formate, fumarate, gluconate, glutamate, glycolate, hydroxymalate, carboxylate, lactate, laurate, lactate, maleate, malate, methanesulfonate, oleate, oxalate, palmitate, phenylacetate, phenylsulfonate, propionate, pyruvate, salicylate, stearate, succinate, sulfanilate, tartarate, toluenesulfonate, and valerate. Examples of suitable polymeric organic anions include those derived from tannic acid and carboxymethyl cellulose.

Alternatively, in some embodiments the compound of formula (I) is provided as a salt, for example in a deprotonated form together with a suitable counter cation.

Suitable counter cations include both organic and inorganic cations. Examples of suitable inorganic cations include alkali metal ions such as Na$^+$ and K$^+$, alkaline earth cations such as Ca$^{2+}$ and Mg$^{2+}$, and other cations such as Al$^{3+}$. Examples of suitable organic cations include the ammonium ion (i.e., NH$_4^+$) and substituted ammonium ions (e.g., NH$_3$R$^+$, NH$_2$R$_2^+$, NHR$_3^{30}$, NR$_4^+$). Examples of substituted ammonium ions include those derived from ethylamine, diethylamine, dicyclohexylamine, triethylamine, butylamine, ethylenediamine, ethanolamine, diethanolamine, piperazine, benzylamine, phenylbenzylamine, choline, meglumine, and tromethamine, as well as amino acids, such as lysine and arginine. An example of a common quaternary ammonium ion is $N(CH_3)_4^+$.

Solvates

In some embodiments, the compound of formula (I) is provided in desolvated form, for example, in dehydrated form.

Alternatively, it may be convenient or desirable to prepare, purify, and/or handle a corresponding solvate of the compound.

Accordingly, in some embodiments the compound of formula (I) is provided in the form of a solvate (a complex of solute (e.g., compound, salt of compound) and solvent). Examples of solvates include hydrates, for example, a mono-hydrate, a di-hydrate and a tri-hydrate.

Methods of Synthesis

Methods for the synthesis of the compound of formula (I) are set out in the worked examples. Additional information relevant to the synthesis of synthetic cannabinoids can be found in Gong et al. (2019).

Pharmaceutical Compositions

While it is possible for the compound of formula (I) to be administered alone, it is preferable to administer a pharmaceutical composition (e.g., a formulation, preparation, or medicament) comprising the compound of formula (I) together with one or more other pharmaceutically acceptable ingredients.

Accordingly, the invention provides a pharmaceutical composition comprising a compound of formula (I), or a salt thereof, together with one or more pharmaceutically acceptable ingredients.

Suitable pharmaceutically acceptable ingredients (e.g. carriers, diluents, excipients, etc.) can be found in standard pharmaceutical texts, for example, Remington: The Science and Practice of Pharmacy, 20th Edition, 2000, pub. Lippincott, Williams & Wilkins; and Handbook of Pharmaceutical Excipients, 2nd edition, 1994.

Examples of suitable pharmaceutically acceptable ingredients include pharmaceutically acceptable carriers, diluents (e.g. oils), excipients, adjuvants, fillers, buffers, binders, disintegrants, preservatives, antioxidants, lubricants, stabilisers, solubilisers, surfactants (e.g., wetting agents), masking agents, colouring agents, flavouring agents, and sweetening agents.

In a preferred embodiment, the pharmaceutical composition comprises, one or more of: an excipient selected among a carrier, an oil, a disintegrant, a lubricant, a stabilizer, a flavouring agent, an antioxidant, a diluent and another pharmaceutically effective compound.

The pharmaceutical composition may be in any suitable form. Examples of suitable forms include liquids, solutions (e.g., aqueous, nonaqueous), suspensions (e.g., aqueous, non-aqueous), emulsions (e.g., oil-in-water, water-in-oil), syrups, electuaries, mouthwashes, drops, tablets (including, e.g., coated tablets), granules, powders, losenges, pastilles, capsules (including, e.g., hard and soft gelatin capsules), cachets, pills, ampoules, boluses, suppositories, pessaries, tinctures, gels, pastes, ointments, creams, lotions, oils, foams, sprays, and aerosols.

In a preferred embodiment, the form of the pharmaceutical composition is selected from a tablet, a capsule, a granule, a powder for inhalation, a sprinkle, an oral solution and a suspension.

Medical Treatment

The inventors have found that the compound of formula (I) is biologically active. The worked examples demonstrate that the compound of formula (I) displays anticonvulsant activity in a mouse model. As such, the compound of formula (I) and its salts, as well as pharmaceutical compositions comprising the compound of formula (I) or its salts, will be useful in medical treatment.

Accordingly, the invention provides a compound of formula (I), or a salt thereof, for use in a method of treatment, for example for use in a method of treatment of the human or animal body by therapy (i.e. a method of therapy).

The invention also provides a compound of formula (I), or a salt thereof, for use as a medicament.

The invention also provides a method of treatment comprising administering to a subject in need of treatment a therapeutically effective amount of compound (I), or a salt thereof.

The invention also provides the use of compound (I), or a salt thereof, for the manufacture of a medicament.

Conditions Treated

The inventors have found that the compound of formula (I) displays anticonvulsant activity in a mouse model of generalised seizure. Accordingly, the compound of formula (I), its salts, as well as pharmaceutical compositions comprising the compound of formula (I) or its salts, will be useful in the treatment of certain conditions associated with seizure.

Similarly, the compound of formula (I), its salts, as well as pharmaceutical compositions comprising the compound of formula (I) or its salts, will be useful as medicaments for treating (and in the manufacture of medicaments for treating) certain conditions associated with seizure.

In a preferred embodiment, the condition associated with seizure is epilepsy.

In one embodiment, the condition associated with seizure is generalised seizure, such as generalised seizure associated with epilepsy.

In one embodiment, the condition associated with seizure is tonic-clonic seizures, such as tonic-clonic seizures associated with epilepsy.

The Subject/Patient

The method of treatment typically comprises administering a compound of formula (I), or a salt thereof, to a subject or patient.

The subject/patient may be a chordate, a vertebrate, a mammal, a placental mammal, a marsupial (e.g., kangaroo, wombat), a rodent (e.g., a guinea pig, a hamster, a rat, a mouse), murine (e.g., a mouse), a lagomorph (e.g., a rabbit), avian (e.g., a bird), canine (e.g., a dog), feline (e.g., a cat), equine (e.g., a horse), porcine (e.g., a pig), ovine (e.g., a sheep), bovine (e.g., a cow), a primate, simian (e.g., a monkey or ape), a monkey (e.g., marmoset, baboon), an ape (e.g., gorilla, chimpanzee, orangutan, gibbon), or a human. Furthermore, the subject/patient may be any of its forms of development, for example, an infant or child.

In a preferred embodiment, the subject/patient is a human, more preferably an adult human.

The subject/patient may also be a non-human mammal used in laboratory research, such as a rodent. Rodents include rats, mice, guinea pigs and chinchillas.

Routes of Administration

The method of treatment may comprise administering a compound of formula (I), or a salt thereof, to a subject by any convenient route of administration, whether systemically/peripherally or topically (i.e., at the site of desired action).

The route of administration may be oral (e.g., by ingestion); buccal; sublingual; transdermal (including, e.g., by a patch, plaster, etc.); transmucosal (including, e.g., by a patch, plaster, etc.); intranasal (e.g., by nasal spray); ocular (e.g., by eyedrops); pulmonary (e.g., by inhalation or insufflation therapy using, e.g., via an aerosol, e.g., through the mouth or nose); rectal (e.g., by suppository or enema); vaginal (e.g., by pessary); parenteral, for example, by injection or infusion, including subcutaneous, intradermal, intramuscular, intravenous, intraarterial, intracardiac, intrathecal, intraspinal, intracapsular, subcapsular, intraorbital, intraperitoneal, intratracheal, subcuticular, intraarticular, subarachnoid, and intrasternal; or by implant of a depot or reservoir, for example, subcutaneously or intramuscularly.

Dosages

The method of treatment typically comprises administering a therapeutically effective amount of a compound of formula (I), or a salt thereof, to a subject.

Appropriate dosages of the compound of formula (I), its salts, as well as pharmaceutical compositions comprising the compound of formula (I) or its salts, can vary from patient to patient. Determining the optimal dosage will generally involve balancing the level of therapeutic benefit against any risk or deleterious side effects. The selected dosage level will depend on a variety of factors including, but not limited to, the activity of the particular compound of formula (I), the route of administration, the time of administration, the rate of excretion of the compound, the duration of the treatment, other active agents, compounds, and/or materials used in combination, the severity of the condition, and the species, sex, age, weight, condition, general health, and prior medical history of the patient. The dosage and route of administration will ultimately be at the discretion of the clinician, although generally the dosage will be selected to achieve local concentrations at the site of action which achieve the desired effect without causing substantial harmful or deleterious side-effects.

Administration can be effected in one dose, continuously or intermittently (e.g., in divided doses at appropriate intervals) throughout the course of treatment. Single or multiple administrations can be carried out with the dose level and pattern being selected by the treating clinician.

Other Aspects and Embodiments

Each and every compatible combination of the embodiments described above is explicitly discloses herein, as if each and every combination was individually and explicitly recited.

Carious further aspects and embodiment of the present invention will be apparent to those skilled in the art in view of the present disclosure.

Where used, "and/or" is to be taken as a specific disclosure of each of the relevant components or features alone as well as a specific disclosure of the combination of the components or features. For example, "A and/or B" is to be taken as specific disclosure of each of i) A, ii) B, and ii) A and B, just as if each were set out individually.

Unless context dictates otherwise, the descriptions and definitions of the features set out above are not limited to any particular aspect or embodiment of the invention and apply equally to all aspects ad embodiments which are described.

Definitions

The following definitions are provided in order to aid understanding of the invention.

"Cannabinoids" are a group of compounds including the endocannabinoids, the phytocannabinoids and those which are neither endocannabinoids or phytocannabinoids, hereinafter "syntho-cannabinoids".

"Endocannabinoids" are endogenous cannabinoids, which are high affinity ligands of CB1 and CB2 receptors.

"Phytocannabinoids" are cannabinoids that originate in nature and can be found in the *cannabis* plant. The phytocannabinoids can be present in an extract including a botanical drug substance, isolated, or reproduced synthetically.

"Syntho-cannabinoids" are those compounds that are not found endogenously or in the *cannabis* plant. Examples include WIN 55212 and rimonabant.

An "isolated phytocannabinoid" is one which has been extracted from the *cannabis* plant and purified to such an extent that all the additional components such as secondary and minor cannabinoids and the non-cannabinoid fraction have been removed.

A "synthetic cannabinoid" is one which has been produced by chemical synthesis. This term includes modifying an isolated phytocannabinoid, by, for example, forming a pharmaceutically acceptable salt thereof.

A "substantially pure" cannabinoid is defined as a cannabinoid which is present at greater than 95% (w/w) pure. More preferably greater than 96% (w/w) through 97% (w/w) thorough 98% (w/w) to 99% % (w/w) and greater.

Epilepsy is considered to be a disease of the brain defined by any of the following conditions: (1) At least two unprovoked (or reflex) seizures occurring >24 h apart; (2) one unprovoked (or reflex) seizure and a probability of further seizures similar to the general recurrence risk (at least 60%) after two unprovoked seizures, occurring over the next 10 years; (3) diagnosis of an epilepsy syndrome (A practical clinical definition of epilepsy by the International League Against Epilepsy (ILAE), 2014).

The term "generalized seizure" ("generalized onset seizures") refers to seizures conceptualized as originating at some point within the brain and rapidly engaging bilaterally distributed networks (Operational Classification of Seizure Types by the ILAE, 2017.

A "tonic-clonic seizure" occurs in two phases, a tonic phase typically involving muscle stiffening and loss of consciousness, and a clonic phase typically involving rhythmically jerking of the limbs.

The term "pharmaceutically acceptable" pertains to compounds, ingredients, materials, compositions, dosage forms, etc., which are, within the scope of sound medical judgment, suitable for use in contact with the tissues of the subject in question (e.g., human) without excessive toxicity, irritation, allergic response, or other problem or complication, commensurate with a reasonable benefit/risk ratio. Each ingredient (e.g. carrier, diluent, excipient, etc.) must also be "acceptable" in the sense of being compatible with the other ingredients of the composition.

The term "therapeutically-effective amount" pertains to that amount of a compound, or a material, composition or dosage form comprising a compound, which is effective for producing some desired therapeutic effect, commensurate with a reasonable benefit/risk ratio, when administered in accordance with a desired treatment regimen.

WORKED EXAMPLES

Certain aspects and embodiments of the invention will not be illustrated by way of example and with reference to the figures described above.

Example 1: Synthetic Production Method for CBD Derivative

This example describes a novel method of synthesis which was used to produce a novel analogue of CBD which demonstrated pharmacological activity. Scheme 1 below describes the three stages of the reaction which was used to produce the CBD derivative, formed via a number of intermediates.

The cannabidiol derivative of the invention is (1'R,2'R)-5'-methyl-4-(1-methyl-1H-pyrazol-4-yl)-2'-(prop-1-en-2-yl)-1',2',3',4'-tetrahydro-[1,1'-biphenyl]-2,6-diol, and will be referred to as the compound of formula (I) or compound 1 throughout.

Analytical data of compound 1 is as follows: $^1$H NMR (500 MHz, DMSO) δ 8.88 (s, 2H), 7.81 (s, 1H), 7.53 (s, 1H), 6.32 (s, 2H), 5.11 (m, 1H), 4.51 (m, 1H), 4.42 (dd, J=3.0, 1.6 Hz, 1H), 3.86 (m, 1H), 3.80 (s, 3H), 3.05 (ddd, J=13.2, 10.5, 2.8 Hz, 1H), 2.09 (m, 1H), 1.97 (m, 1H), 1.69 (m, 1H), 1.63 (m, 1H), 1.56 (s, 3H), 1.55 (s, 3H). MS (ES+): m/z 325.2 (M+1). HPLC purity 99.2%.

Scheme 1: Synthesis of CBD derivative

| Compound | Name |
|---|---|
| 1 | Menthadienol |
| 2 | Benzene-1,3,5-triol (Phloroglucinol) |
| 3 | (1'R,2'R)-5'-Methyl-2'-(prop-1-en-2-yl)-1',2',3',4'-tetrahydro-[1,1'-biphenyl]-2,4,6-triol |
| 4 | (1'R,2'R)-2,6-Dihydroxy-5'-methyl-2'-(prop-1-en-2-yl)-1',2',3',4'-tetrahydro-[1,1'-biphenyl]-4-yl trifluoromethanesulfonate |
| 5 | 1-Methyl-4-(4,4,5,5-tetramethyl-1,3,2-dioxaborolan-2-yl)-1H-pyrazole |
| 6 | (1'R,2'R)-5'-methyl-4-(1-methyl-1H-pyrazol-4-yl)-2'-(prop-1-en-2-yl)-1',2',3',4'-tetrahydro-[1,1'-biphenyl]-2,6-diol |

(1S,4R)-1-Methyl-4-(prop-1-en-2-yl)cyclohex-2-en-1-ol (Menthadienol) was coupled with Phloroglucinol using $BF_3$—$OEt_2$ to give the trihydroxybenzene derivative in moderate yield.

Treatment with trifluoromethanesulphonic anhydride in a regioselective triflation gave the aryl triflate in a good yield.

The aryl triflate and pyrazole boronate were coupled in a Suzuki reaction, catalysed by palladium. The title compound was afforded, in a good yield, after IMS crystallisation.

Example 2: Evaluation of Cannabinoid Derivative for Anticonvulsant Activity Using the Maximal Electroshock Seizure Threshold (MEST) Test in the Mouse The efficacy of the cannabinoid derivative according to formula (I) was tested in a mouse model of generalised seizure, the maximal electroshock seizure threshold (MEST) test.

The maximal electroshock seizure threshold (MEST) test is widely utilized preclinically to evaluate pro- or anti-convulsant properties of test compounds (Loscher et al., 1991).

In the MEST test the ability of a drug to alter the seizure threshold current required to induce hind limb tonic extensor convulsions is measured according to an "up and down" method of shock titration (Kimball et al., 1957). An increase in seizure threshold is indicative of anti-convulsant effect. Antiepileptic drugs including the sodium channel blockers (e.g. lamotrigine) with clinically proven efficacy against generalised tonic-clonic seizures all exhibit anti-convulsant properties in this test in the mouse.

Conversely, a reduction in seizure threshold is indicative of a pro-convulsant effect as observed with known convulsant agents such as picrotoxin.

The ability of a test compound to alter the stimulus intensity, expressed as current (mA), required to induce the presence of tonic hind limb extensor convulsions, is assessed in the MEST. The outcome of the presence (+) or absence (0) of tonic hind limb extensor convulsions observed from a current to produce tonic hind limb extension in 50% of animals in the treatment group ($CC_{50}$) determines the seizure threshold for the treatment group and the effects were then compared to the $CC_{50}$ of the vehicle control group.

Methods

Study Details:

Naïve mice were acclimatised to the procedure room in their home cages for up to 7 days, with food and water available ad libitum.

All animals were weighed at the beginning of the study and randomly assigned to treatment groups based on a mean distribution of body weight across groups. All animals were dosed at 10 mL/kg via intraperitoneal (i.p) injection, with either vehicle, test compound at 2, 20 or 200 mg/kg or diazepam at 2.5 mg/kg.

Animals were individually assessed for the production of a tonic hind limb extensor convulsion at 30 min post-dose for vehicle, 30 min post-dose for test compound and 30 min post-dose for diazepam, from a single electroshock.

The first animal within a treatment group was given a shock at the expected or estimated $CC_{50}$ current. For subsequent animals, the current was lowered or raised depending on the convulsions outcome from the preceding animal, in intervals of 5 mA.

Data generated from each treatment group were used to calculate the $CC_{50} \pm SEM$ values for the treatment group.

Test Compounds:

Vehicle: (5% ethanol, 10% solutol, 85% Saline) was prepared as follows: 1 mL of ethanol, 2 mL of solutol were warmed to 60° C., in 17 mL of saline (1:2:17).

Positive control: diazepam was used at 2.5 mg/kg.

The test compound, described herein as compound 1, is as shown as formula (I). Test compound was administered at 2, 20 and 200 mg/kg (i.p.) in a 1:2:17 ethanol:solutol:0.9% saline formulation.

Sample Collection:

Each animal was humanely killed immediately after production of a convulsion by destruction of the brain from striking the cranium, followed by the confirmation of permanent cessation of the circulation from decapitation under The Humane Killing of Animals under Schedule 1 to the Animals (Scientific Procedures) Act 1986. Terminal blood and brain collection were performed following decapitation.

Blood was collected in Lithium-heparin tubes and centrifuged at 4° C. for 10 minutes at 1500×g. The resulting plasma was removed (>100 µL) and split into 2 aliquots of 0.5 mL Eppendorf tubes containing 100 µL of ascorbic acid (100 mg/mL) for stabilisation. Brains were removed, washed in saline and halved. Each half was placed into separate 2 mL screw cap cryovials, weighed and frozen on cardice.

Statistical Analysis

The data for each treatment group were recorded as the number of +'s and 0's at each current level employed and this information is then used to calculate the $CC_{50}$ value (current required for 50% of the animals to show seizure behaviour)±standard error.

Test compound effects were also calculated as percentage change in $CC_{50}$ from the vehicle control group.

Significant difference between drug-treated animals and controls were assessed according to Litchfield and Wilcoxon (1949).

Results

Figure 1:
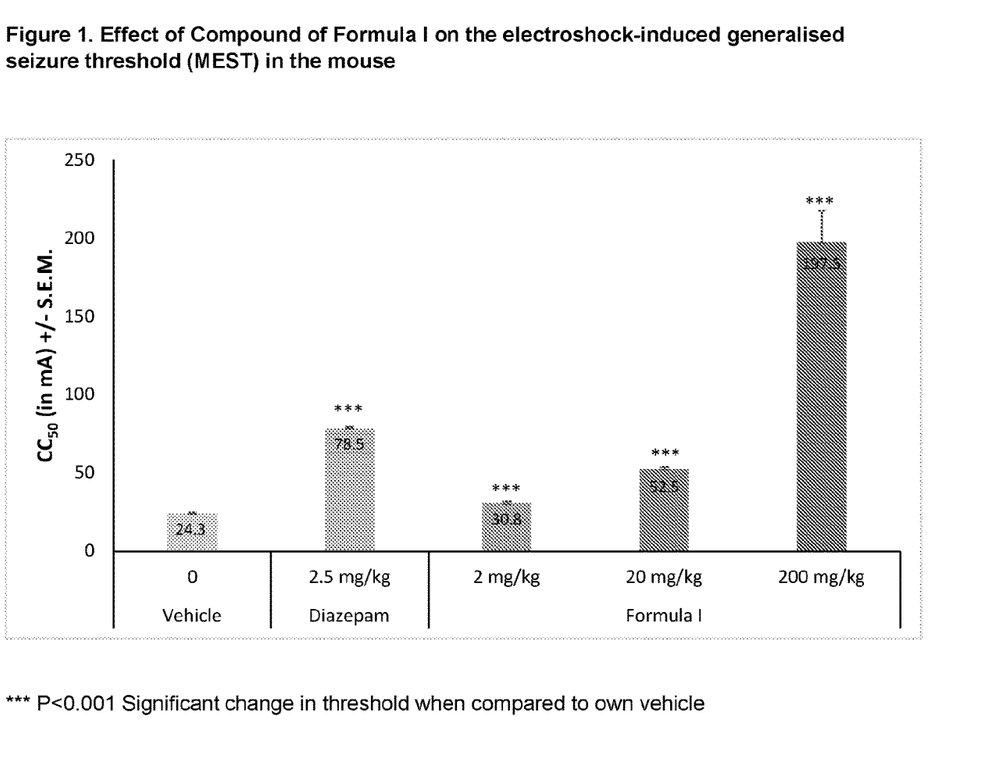
FIG. 1 shows the evaluation of the test compound, as shown as formula (I), in the MEST test in the mouse as described in Example 2.

FIG. 1 and Table 1 describe the data produced in this experiment.

In the vehicle group, the $CC_{50}$ value was calculated to be 24.3 mA.

In the diazepam (2.5 mg/kg) treated group, administered i.p. 30 minutes before the test, the $CC_{50}$ value was 78.5 mA. This result was statistically significant (p<0.001) compared to the vehicle control. One animal in the diazepam group, was not dosed due to welfare issues from fighting.

In the test compound treatment group, administered i.p. 30 minutes before the test, Compound 1 produced a statistically significant $CC_{50}$ value compared to vehicle at all three doses of the compound.

Such data are indicative that this compound will be of therapeutic benefit.

TABLE 1

Evaluation of effect of compound 1 in the MEST test

| Treatment | Dose (mg/kg) | Test time post dose (min) | N | $CC_{50}$ +/− SEM | Significance | % change from vehicle |
|---|---|---|---|---|---|---|
| Vehicle | — | 30 | 12 | 24.3 ± 0.4 | — | — |
| Diazepam | 2.5 | 30 | 11 | 78.5 ± 1.0 | P < 0.001 | 223% |
| Compound 1 | 2 | 30 | 12 | 30.8 ± 1.0 | P < 0.001 | 27% |
| Compound 1 | 20 | 30 | 12 | 52.5 ± 1.3 | P < 0.001 | 116% |
| Compound 1 | 200 | 30 | 12 | 197.5 ± 20.4 | P < 0.001 | 712% |

Conclusions

These data demonstrate a therapeutic effect for the compound of formula (I).

These data are significant as they provide heretofore unknown evidence that this novel cannabinoid derivative may be of therapeutic value.

Clearly the compound produced a dose-related increase in MEST, suggesting that this compound exhibits anticonvulsive properties. Significant effects were observed at 2, 20 and 200 mg/kg, when compared to vehicle.

Example 3: Evaluation of Pharmacokinetic Properties of Cannabinoid Derivative The plasma pharmacokinetics of compound 1 was assessed following oral dose administration to male Wistar Han Rats.

Methods

Study Details:

The Wistar Han Rat was chosen as the animal model for this study as it is an accepted rodent species for preclinical toxicity testing by regulatory agencies. Animals were socially housed (up to 3 animals of the same group) in polycarbonate cages containing appropriate bedding equipped with water bottles and may be provided with items such as devices for hiding in, paper and/or objects for chewing, unless contraindicated by study procedures. Pelleted rodent diet were provided ad libitum throughout the study, except during designated procedures.

The 9 male animals were 8 to 10 weeks old at initiation of dosing.

Test Compound:

Vehicle: 1% Ethanol/12% Kolliphor HS-15/87% Saline (w/w/v).

Dose formulation was prepared as follows: test item was dissolved in ethanol. Kolliphor HS-15 and saline was heated separately to 60° C., and the required amount of heated Kolliphor HS-15 added to the test item/ethanol solution. The mixture was stirred at until homogenous. Hot saline was added to the mixture to meet dose level requirements, and stirred at 60° C. until a homogenous solution. Prior to release, the formulations were allowed to cool to 40° C. Subsequently, the formulations were stored at room temperature until dosing.

Treatment:

Groups 1, 2 and 3: The test item was administered to the appropriate animals by oral gavage. The dose was given using a plastic feeding tube.

TABLE 2

Study Design

| Group No. | Dose level (mg/kg) | Dose volume (mL/kg) | No. of animals | Animal No. |
|---|---|---|---|---|
| 1 | 15 | 10 | 3 | 1-3 |
| 2 | 45 | 10 | 3 | 4-6 |
| 3 | 150 | 10 | 3 | 7-9 |

Sample Collection:

PK Sample Collection: From animals in Group 1 to 3 blood was collected according to the PK sample collection table (outlined in Table 3). Approximately 0.2 mL blood samples was taken from the jugular vein and collected into tubes containing K2 EDTA as anti-coagulant and stored on ice.

Sample Processing and Storage: Whole blood was processed to plasma by centrifugation (3000 g for 10 minutes at 5° C.) within 1 hour of collection. Plasma samples were transferred into labelled polypropylene tubes and stored at <−75° C. until shipment.

TABLE 3

Bioanalytical Sample Collection

| Group No. | PK Sample Collection Time Points (post dose) | | | | | | |
|---|---|---|---|---|---|---|---|
| | 15 min | 30 min | 1 h | 2 h | 4 h | 8 h | 24 h |
| 1 | 1-3 | 1-3 | 1-3 | 1-3 | 1-3 | 1-3 | 1-3 |
| 2 | 4-6 | 4-6 | 4-6 | 4-6 | 4-6 | 4-6 | 4-6 |
| 3 | 7-9 | 7-9 | 7-9 | 7-9 | 7-9 | 7-9 | 7-9 |

Results

Figure 2:
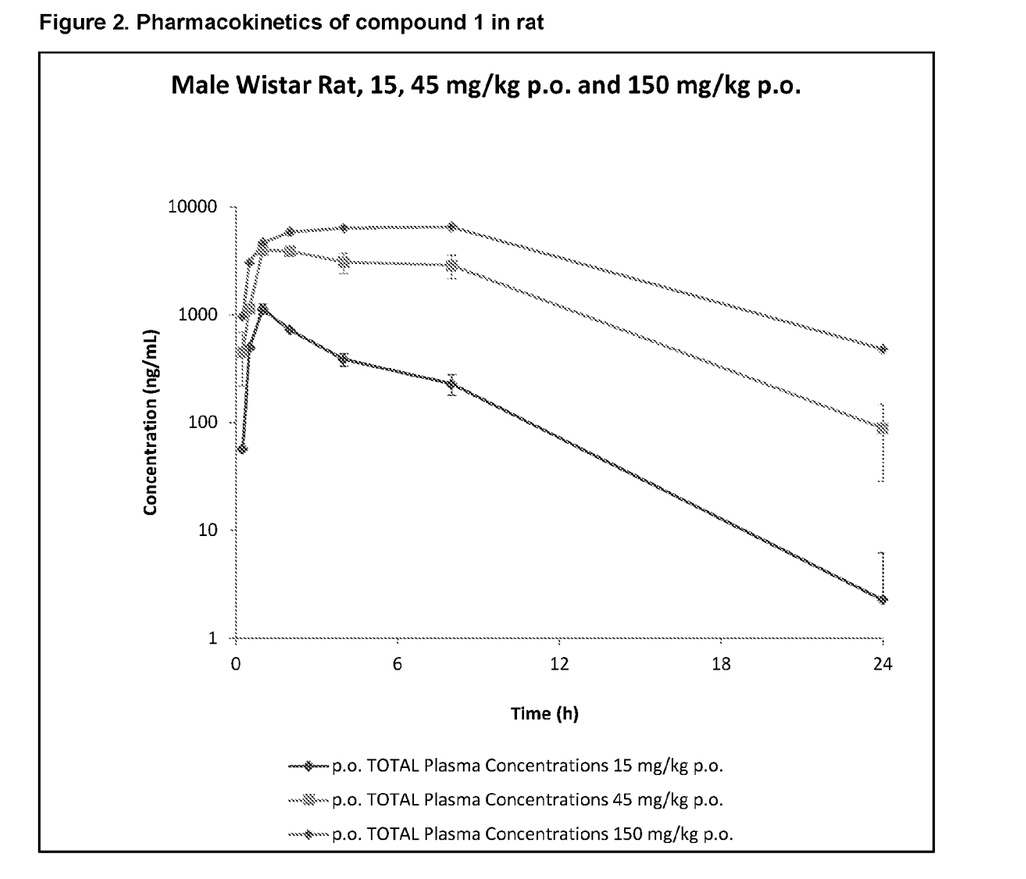
FIG. 2 shows pharmacokinetics of compound 1 in rat as described in Example 3.
Figure 3:
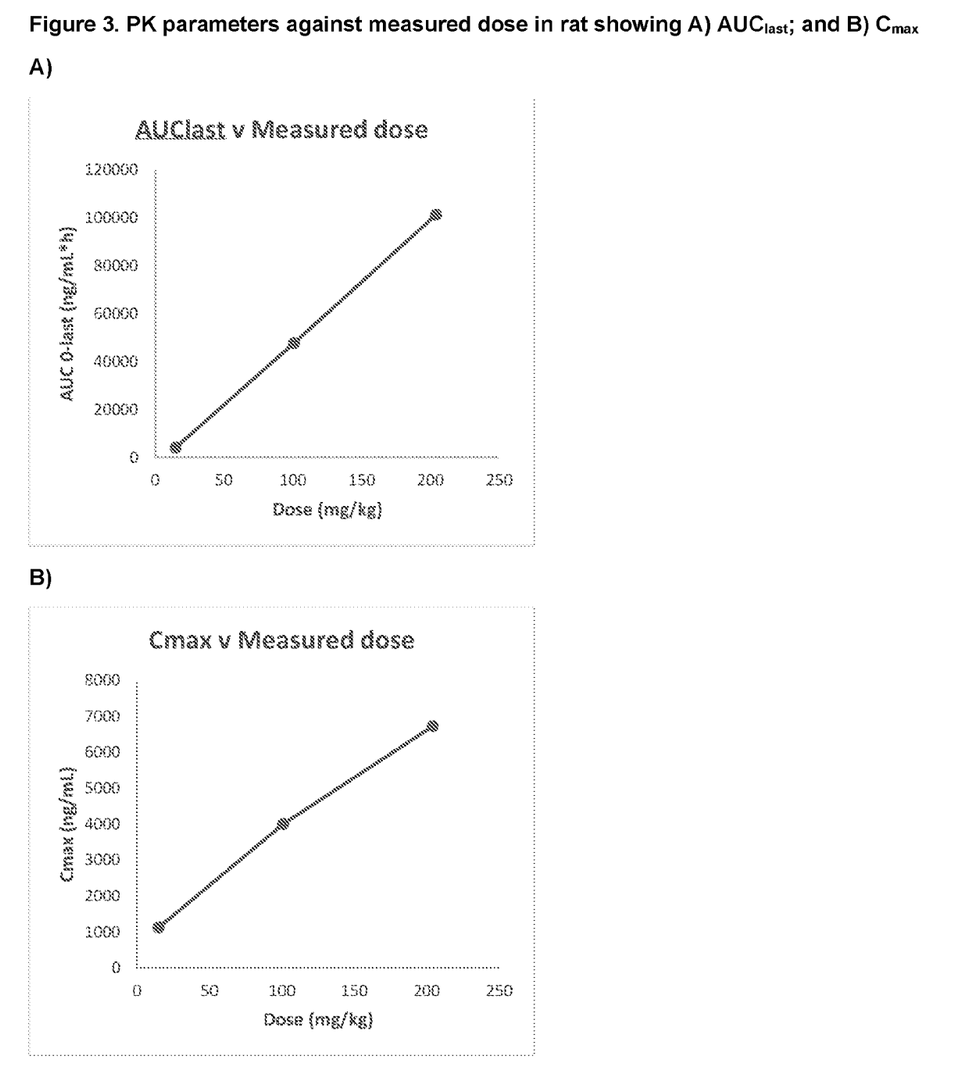
FIG. 3 shows specific PK parameters A) AUClast and B) Cmax of compound 1 in rat as described in Example 3.

FIGS. 2 to 3 and Table 4 provide the data produced in this experiment. Bioavailability was found to be high across concentrations with $T_{max}$ at 1 hour for 15 and 45 mg/kg dose groups. Exposure and $C_{max}$ increase in a linear fashion with dose in rat (FIG. 3).

TABLE 4

Rat Pharmacokinetics of compound 1

| PK Parameter | 15 mg/kg | 45 mg/kg | 150 mg/kg |
|---|---|---|---|
| Measured Dose (mg/kg) | 15 | 101 | 204 |
| $C_{max}$ (ng/mL) | 1126 | 4006 | 6730 |
| $T_{max}$ (h) | 1.00 | 1.00 | 8.0 |
| $t_{1/2}$ (h) | 3.3 | 3.6 | 4.3 |
| $AUC_{last}$ (ng/mL · hr) | 4247 | 47854 | 101383 |
| $AUC_{inf}$ (ng/mL · hr) | 5326 | 48346 | 104914 |
| Bioavailability (%) | 69.6 | 96.4 | 107 |

Conclusions

The data provided in this Example allowed determination of the intrinsic pharmacokinetics of the test compound (compound 1) to enable its proper characterisation. Favourable pharmacokinetic data demonstrate suitability of this novel compound as a treatment option for conditions associated with seizure.

REFERENCES

A number of publications are cited above in order to more fully describe and disclose the invention and the state of the art to which the invention pertains. Full citations for these references are provided below. The contents of each of these references is incorporated herein.

1. Gong et al., "Synthesis of CBD and Its Derivatives Bearing Various C4'-Side Chains with a Late-Stage Diversification Method", *J. Org. Chem,* 2020, Vol. 85, pp. 2704-2715.

The invention claimed is:

1. A compound of formula (I), or a pharmaceutically acceptable salt thereof, (I)

2. A pharmaceutical composition comprising the compound of claim 1 and one or more pharmaceutically acceptable ingredients.

3. The pharmaceutical composition of claim 2 in a form selected from a liquid, a solution, a suspension, an emulsion, a syrup, an electuary, a mouthwash, a drop, a tablet, a granule, a powder, a lozenge, a pastille, a capsule, a cachet, a pill, an ampoule, a bolus, a suppository, a pessary, a tincture, a gel, a paste, an ointment, a cream, a lotion, an oil, a foam, a spray, and an aerosol.

4. A method of treating seizures in a subject comprising administering a compound of formula (I), or a pharmaceutically acceptable salt thereof, (I)

5. A method of treating epilepsy in a subject comprising administering a compound of formula (I), or a pharmaceutically acceptable salt thereof, (I)

6. The method of claim 4, wherein the seizures are generalized seizures.

7. The method of claim 4, wherein the seizures are tonic-clonic seizures.

8. The pharmaceutical composition of claim 2, wherein the one or more additional pharmaceutically acceptable ingredients selected from any one of carriers, diluents, excipients, adjuvants, fillers, buffers, binders, disintegrants, preservatives, antioxidants, lubricants, stabilisers, solubilises, surfactants, masking agents, coloring agents, flavoring agents, and sweetening agents.

9. A method of manufacturing the compound of claim 1, comprising:
 (i) combining menthandienol and benzene-1,3,5-triol to form (1'R, 2'R)-5'-methyl-2'-(prop-1-en-2-yl)-1',2',3',4'-tetrahydro-[1,1'-biphenyl]-2,4,6-triol;
 (ii) treating (1'R, 2'R)-5'-methyl-2'-(prop-1-en-2-yl)-1',2',3',4'-tetrahydro-[1,1'-biphenyl]-2,4,6-triol with trifluoromethanesulphonic anhydride to form (1'R,2'R)-2,6-dihydroxy-5'-methyl-2'-(prop-1-en-2-yl)-1',2',3',4'-tetrahydro-[1,1'-biphenyl]-4-yl trifluoromethanesulfonate; and
 (iii) coupling (1'R,2'R)-2,6-dihydroxy-5'-methyl-2'-(prop-1-en-2-yl)-1',2'3',4'-tetrahydro-[1,1'-biphenyl]-4-yl trifluoromethanesulfonate and 1-methyl-4-(4,4,5,5-tetramethyl-1,3,2-dioxaborolan-2-yl)-1H-pyrazole to form the compound of claim 1.

* * * * *